(Model.)

H. O. KOSCHWITZ.
Manufacture of Buttons, &c.

No. 234,989.  Patented Nov. 30, 1880.

WITNESSES:
A. Schehl.
C. Sedgwick

INVENTOR:
H. O. Koschwitz
BY Munn & Co
ATTORNEYS.

UNITED STATES PATENT OFFICE.

HENRY O. KOSCHWITZ, OF BROOKLYN, E. D., NEW YORK.

MANUFACTURE OF BUTTONS, &c.

SPECIFICATION forming part of Letters Patent No. 234,989, dated November 30, 1880.

Application filed July 29, 1880. (Model.)

*To all whom it may concern:*

Be it known that I, HENRY OTTO KOSCHWITZ, of Brooklyn, E. D., Kings county, New York, have invented a new and useful Improvement in Making Buttons and Similar Articles, of which the following is a specification.

The object of my invention is to provide certain improvements in the process of making buttons, studs, breastpins, and similar articles, whereby the said articles can be produced much more perfectly and more rapidly and at less expense than heretofore.

The invention consists in turning a cylinder with circumferential band or striped ornaments on a lathe or other suitable device, which cylinder is then turned at right angles to the first movement, whereby circumferential striped or band ornaments are produced upon the heads or the ends of the cylinder. The same is then split longitudinally in two or more parts, the surfaces of which are ground down and polished.

Figure 1:
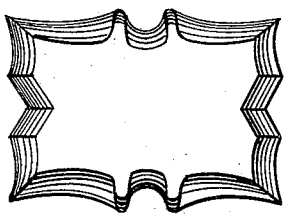
Figure 2:
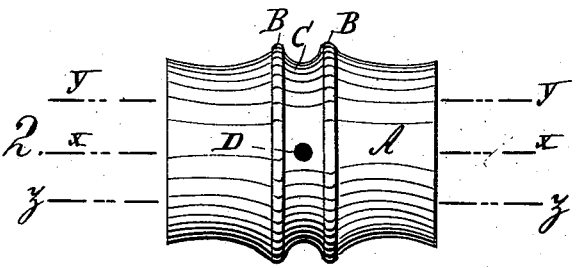
Figure 3:
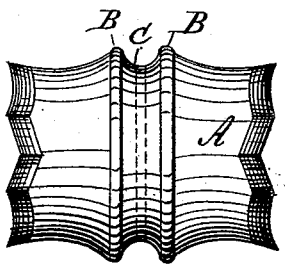
Figure 4:
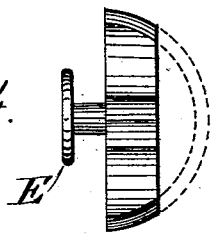

In the accompanying drawings, Figure 1 is a plan view of a cuff-button made according to my improved process. Fig. 2 is an elevation of the cylinder with the circumferential or striped ornament. Fig. 3 is an elevation of the cylinder having the circumferential striped or banded ornaments on the ends or heads also, and Fig. 4 is an end elevation of the cuff-button.

Similar letters of reference indicate corresponding parts.

In carrying out my invention, the first step is to turn a cylinder, A, of horn, ivory, metal, wood, celluloid, rubber, or any other material, which cylinder is provided with circumferential banded or striped ornaments, in this case consisting of two beads, B B, and the groove C, but may consist of any other desired pattern. A centering-hole, D, is then bored in the cylinder A, and the centers of the lathe are passed into the ends of said hole, so that the cylinder will now rotate on one of its diameters—that is, it revolves in a direction at right angles to the direction in which the cylinder moved when the first circumferential ornaments were cut thereon. While rotating on one of its diameters circumferential ornaments are again cut into the cylinder; but, as is evident, they will only show on the ends or heads of the cylinder thus rounded, as shown in Fig. 3. The cylinder is then split or sawed apart on the lines $x\ x$, or also on the lines $y\ y$ $z\ z$, thereby dividing it into two or more parts, which are ground or planed down to a certain thickness, as shown in Fig. 4. They are then polished and provided with a shank or button, E. The edges will be beveled on a segmental line molded according to the ornaments produced on the cylinder, for the moldings on the longitudinal edges are produced by turning the cylinder on its longitudinal axis, and the moldings on the transverse edges are produced by turning the cylinder on one of its diameters, as shown in Fig. 1. Sleeve and collar buttons, watch-charms, ear-rings, breastpins, or any other kind of ornaments can thus be produced in a simple manner, in a very short time, and with an elegant finish.

Having thus described my invention, I claim as new and desire to secure by Letters Patent—

The method, substantially as herein shown and described, of making buttons and similar articles, consisting in turning the articles in a lathe first in one direction and then in a direction at right angles to the first, and then splitting or cutting the cylinder with rounded ends thus obtained longitudinally into several pieces, which are ground or planed and polished, as set forth.

HENRY OTTO KOSCHWITZ.

Witnesses:
OSCAR F. GUNZ,
C. SEDGWICK.